US006267801B1

United States Patent
Baake et al.

(10) Patent No.: US 6,267,801 B1
(45) Date of Patent: Jul. 31, 2001

(54) METHOD FOR PRODUCING A TUBULAR HYDROGEN PERMEATION MEMBRANE

(75) Inventors: Reinhard Baake, Krombach; David Francis Lupton, Gelnhausen, both of (DE)

(73) Assignee: W. C. Heraeus GmbH & Co. KG, Hanau (DE)

( * ) Notice: Subject to any disclaimer, the term of this patent is extended or adjusted under 35 U.S.C. 154(b) by 0 days.

(21) Appl. No.: 09/392,101

(22) Filed: Sep. 8, 1999

(30) Foreign Application Priority Data

Sep. 22, 1998 (DE) .............................................. 198 43 306

(51) Int. Cl.[7] .................................................. B01D 53/22
(52) U.S. Cl. .................. 95/56; 96/10; 96/11; 55/DIG. 5
(58) Field of Search ............................... 95/55, 56; 96/4, 96/10, 11; 55/524, DIG. 5

(56) References Cited

U.S. PATENT DOCUMENTS

| 3,172,742 | * | 3/1965 | Rubin ................................. 96/11 X |
| 3,238,700 | * | 3/1966 | Cohn ..................................... 95/56 |
| 3,350,846 | | 11/1967 | Makrides et al. ...................... 55/16 |
| 3,447,288 | * | 6/1969 | Juda et al. ............................. 96/11 |
| 4,468,235 | | 8/1984 | Hill ....................................... 55/16 |
| 4,536,196 | | 8/1985 | Harris .................................... 55/16 |
| 4,699,637 | * | 10/1987 | Iniotakis et al. ..................... 96/10 |
| 5,108,724 | | 4/1992 | Buxbaum ........................... 423/248 |
| 5,149,420 | | 9/1992 | Buxbaum ........................... 205/219 |
| 5,215,729 | | 6/1993 | Buxbaum ........................... 423/248 |
| 5,614,001 | * | 3/1997 | Kosaka et al. .................... 96/11 X |
| 5,738,708 | * | 4/1998 | Peachey et al. ..................... 95/56 |

FOREIGN PATENT DOCUMENTS 27 09 807    9/1978 (DE) .

* cited by examiner

Primary Examiner—Robert H. Spitzer
(74) Attorney, Agent, or Firm—Frishauf, Holtz, Goodman, Langer & Chick, P.C.

(57) ABSTRACT

A method for producing a tubular hydrogen permeation membrane comprising: (a) adhering at least one layer containing palladium, at least one palladium alloy, platinum, or at least one platinum alloy to a first surface of a plate having such first surface and a second surface disposed opposite to the first surface, the plate being of a metal or a metal alloy containing at least one metal from a group of the Periodic System of Elements selected from the group consisting of the fourth secondary group and the fifth secondary group, to form a layered plate; and (b) reshaping the layered plate into a tubular hydrogen permeation membrane having an inside wall, so that the layer adhered to the first surface is disposed on the inside wall of the tubular hydrogen permeation membrane.

20 Claims, No Drawings

METHOD FOR PRODUCING A TUBULAR HYDROGEN PERMEATION MEMBRANE

BACKGROUND OF THE INVENTION

1. Field of the Invention

The present invention relates to a method for producing a hydrogen permeation membrane, the hydrogen permeation membrane so produced, and the use of such a hydrogen permeation membrane.

2. Background Information

The peculiarity of palladium, as well as platinum to a considerably lesser extent, of enabling the rapid permeation of hydrogen, but of no other gas, although a membrane of this metal has long been known. In this way, hydrogen can be separated from other gases.

Hydrogen permeation cells that are used to produce hydrogen of the highest purity, have already been known for several decades. In these cells, a palladium alloy is typically used as the membrane. A construction made of tubules which are fixed on one end on a perforated plate (for instance by soldering) and are welded closed, but not fixed on the other has proved to be especially advantageous. The reason why this construction has proved itself especially advantageous in industry is that the palladium material, on absorbing hydrogen, expands, and thus if the tubules were fixed at both ends or if a plane foil were fastened in a rigid frame, would lead to a hydrogen-dictated expansion and thus to the occurrence of stresses and deformation in the palladium membrane, which would quickly cause tearing and porosity.

U.S. Pat. No. 5,215,729 discloses among other subjects a membrane for extracting hydrogen from hydrogen-containing fluid streams; it substantially comprises a first non-porous layer of a refractory metal and a second non-porous layer which is located directly on the first layer; the second layer substantially comprises palladium, palladium alloys, platinum, or platinum alloys. Tubes of small diameter are coated on the inside and outside with a suitable second layer by means of a special sputtering technique.

U.S. Pat. No. 3,350,846 discloses among other subjects a method of sputtering and vapor deposition of palladium onto niobium, vanadium and tantalum surfaces.

These methods known from the prior art can be employed, however, only for relatively large tubes (with an inside tube diameter of at least 25 mm).

It is also known that platinum can be precipitated out of a plurality of different baths either galvanically or currentlessly. Most often, baths on the basis of a palladium complex, palladium diaminodichloride ($Pd(NH_3)_2Cl_2$) are used. With such baths, however, it is virtually impossible to coat the inside surface of tubes, especially tubes with a small inside diameter (maximum inside tube diameter of approximately 25 mm) of easily electroplatable materials. The problems reside both in the delivery of material from the electrolyte within the limited internal space in the tube and also the establishment of uniform electrical fields for the metal deposition in the tube. Furthermore, even under optimal conditions, the refractory metals are very difficult to coat using electroplating methods, since both in air and in contact with aqueous solutions, a thin, firmly adhering and nonconductive surface oxide film forms, which hinders the direct metal-to-metal contact between substrate and coating.

In physical deposition from the vapor phase by vapor deposition or sputtering, two problems arise. First, the vapor deposition material or the sputtering target must be positioned centrally in the tube, and from there must be applied to the inside of the tube by heating or by being bombarded with noble gas ions. Such methods are known for large tubes (inside tube diameter of approximately 100 mm), but not for smaller tubes. Second, the oxide barrier layer on the surface of the refractory metal (refractory metals or metals of the fourth and fifth secondary groups of the Periodic System of Elements) must be removed before the coating process. Normally, such layers are removed by "sputtering off", in which the oxide film is removed by being bombarded with noble gas ions. This process is not possible in the interior of a small tube (inside tube diameter less than 25 mm).

For the above reasons, it is not possible with methods known from the prior art to satisfactorily coat the inside of tubes of refractory metals having a small inside diameter (inside diameter of less that 25 mm) with palladium, a palladium alloy, platinum, or a platinum alloy.

SUMMARY OF THE INVENTION

Based on the above discussion, it is an object of the present invention to overcome the above disadvantages, at least in part, with the aid of a novel method, a novel membrane, and the use thereof. The resultant object is particularly to furnish tubes, which comprise at least one metal of the fourth and fifth secondary groups of the Periodic System of Elements ("PSE") and have small inside diameters (less than 25 mm) that are coated with palladium, a palladium alloy, platinum, or a platinum alloy, at least on the inside of the tube as well, with satisfactory quality.

According to the invention, this object is attained by a method of producing a membrane, a membrane itself and a method of use of the membrane as described hereinbelow.

In the method of producing a tubular hydrogen permeation member according to the present invention, first a one- or two-sided coating (layering) of a plate-like base metal or base metal alloy body is performed. This body contains at least one metal from the fourth or fifth secondary groups of the Periodic System of Elements ("PSE"). The coating (layer) contains at least palladium, at least one palladium alloy, platinum, or at least one platinum alloy, or preferably consists of at least one of these materials.

After the coating (layering), the plate-like coated molded part (layered plate) is reshaped (shaped) into a tubular hydrogen permeation membrane.

More particularly, the present invention concerns a method for producing a tubular hydrogen permeation membrane comprising:

(a) adhering at least one layer containing palladium, at least one palladium alloy, platinum, or at least one platinum alloy to a first surface of a plate (or blank) having such first surface and a second surface disposed opposite to the first surface, the plate being of a metal or a metal alloy containing at least one metal from a group of the Periodic System of Elements selected from the group consisting of the fourth secondary group and the fifth secondary group, to form a layered plate; and (b) reshaping the layered plate into a tubular hydrogen permeation membrane having an inside wall, so that the layer adhered to the first surface is disposed on the inside wall of the tubular hydrogen permeation membrane.

The at least one layer can also be adhered to the second surface of the plate.

DETAILED DESCRIPTION OF THE INVENTION

The plate is made of a metal or metal alloy, wherein the metal is at least one metal selected from the group consisting of the fourth secondary group of the Periodic System of Elements (such as titanium, zirconium and hafnium) and the fifth secondary group of the Periodic System of Elements (such as vanadium, niobium and tantalum).

An essential feature in the method of producing a tubular hydrogen permeation member according to the present invention is that first a coating (layer) of the above composition is applied to an as yet not tubular, but rather plate-like body of the above metal composition, and only after that is a corresponding tubular reshaping (shaping) of the molded part done. This sequence assures that there are no weld seams in the tubes. The otherwise conventional making of round shapes from coated strips and the ensuing welding, in which the coating is lost in the welded zone, is thus dispensed with.

It is thus possible in this elegant way to produce seamless tubes of appropriate composition, which are coated with palladium, a palladium alloy, platinum, or a platinum alloy, in which the inside diameter of the tubes can be only a few millimeters. As a rule, the wall thickness of the tubes is approximately 0.1 to 10.0 mm.

In the method of producing a tubular hydrogen permeation member according to the present invention, it is advantageous if the coating (layering) is performed by means of roll bonding cladding, explosively applied cladding, or diffusion welding and the reshaping is performed by means of deep drawing, pressing or extrusion, because these procedures have proven themselves over time.

Advantageously, PdAg23 is used as a coating (layer), because this alloy has an especially good combination of hydrogen permeability and microstructure stability. Still other alloys based on palladium, such as PdY10, can be used as well.

For producing tubes with an especially small inside diameter, particularly with an inside diameter of less than 5 mm, it is especially advantageous after the reshaping to perform at least one further reshaping by means of a drawing process, because in this way a greater ratio of length to diameter can be attained than by deep-drawing, pressing or extrusion alone, and in many cases furthermore better replicability with respect to the tube dimensions is assured.

For the reshaping into a tubular hydrogen permeation membrane, a molded piece in the form of a round blank is advantageously cut out of the coated molded part, because the further reshaping into a tubular membrane requires comparatively few work steps and thus saves considerable cost.

Finally, it is advantageous that the tubular membrane has a maximum inside tube diameter of 25 mm, in particular 10 mm, since such tubes with a correspondingly small diameter have a favorable volume ratio (a large surface area for a small volume) for permeation.

The membranes made by the method of the present invention have the above-discussed surprising and advantageous properties, in particular an inner tube coating suitable for permeation purposes with an excellent surface-to-volume ratio.

The same is correspondingly true for the use of a membrane made by the method of the present invention for isolating and purifying hydrogen in gas mixtures that contain hydrogen.

EXAMPLES

The following non-limiting examples serve to explain the invention.

Example 1

A niobium plate (100×100×50 mm) was placed between two plates made of the alloy PdAg23 (100×100×4 mm), after the contact faces of the plates had been carefully cleaned and mechanically roughened. The niobium had a hardness of approximately HV 85, and the PdAg alloy had a hardness of approximately HV 95.

The plates were placed under a hydraulic press and pressed with a force of 500 to 2000 $kg/cm^2$; the reshaping amounted to approximately 5 to 15% with regard to thickness.

The composite plate thus created was rolled to a thickness of 10 mm, and after that, a cylindrical preform with a diameter of 10 mm was cut out.

The preform was placed in a female die, closed on the bottom, of hard metal (inside diameter 10.2 mm) and pressed with a hard metal male die (outside diameter 9.4 mm) into a tube by the backwards extrusion process. The tube had a length of approximately 60 mm. After a 30 minute annealing at T=+800° C. in a vacuum ($p<10^{-4}$ mbar), the tube was drawn in a plurality of steps by conventional tube drawing to an outside diameter of 3.5 mm and a total wall thickness of 0.2 mm. At the annealing parameters selected, a destrengthening of both materials that was sufficient for the further reshaping was attained; however, no embrittlement caused by the development of any intermetallic phases was found at the boundary face between the niobium and the PdAg alloy. A usable tube length of 300 mm was attainable. Metallographic studies of the tube showed a firmly adhering, closed layer of the PdAg alloy on the inside and outside of the niobium core material. The coating on the inside had a thickness of approximately 0.015 mm, and that on the outside had a thickness of approximately 0.012 mm.

Example 2

The composite metal plate with a thickness of 10 mm described in Example 1 was rolled further down to a thickness of 3 mm. From this sheet, a round blank with a diameter of 100 mm was cut out and annealed for 30 minutes at a temperature of +800° C. in a vacuum ($p<10^{-4}$ mbar).

By deep drawing in a plurality of steps with graduated female and male dies, a tube with an outside diameter of 26 mm and an inside diameter of 22 mm was produced. After the unusable parts at the end were cut off, the tube had a length of approximately 130 mm.

After a further annealing treatment under the conditions described above, the tube was drawn by conventional tube drawing to an outside diameter of 8 mm and a wall thickness of 0.5 mm. A usable tube length of approximately 1.5 meters was attainable. Metallographic studies of the tube showed a firmly adhering, closed layer of the PdAg alloy on the inside and outside of the niobium core material. The coating on the inside had a thickness of approximately 0.038 mm, and that on the outside had a thickness of approximately 0.032 mm.

It will be appreciated that the instant specification is set forth by way of illustration and not limitation, and that various modifications and changes may be made without departing from the spirit and scope of the present invention.

What is claimed is:

1. A method for producing a tubular hydrogen permeation membrane comprising:

(a) adhering at least one layer containing palladium, at least one palladium alloy, platinum, or at least one platinum alloy to a first surface of a plate having said first surface and a second surface disposed opposite to said first surface, said plate being of a metal or a metal alloy containing at least one metal from a group of the Periodic System of Elements selected from the group consisting of the fourth secondary group and the fifth secondary group, to form a layered plate; and (b) reshaping the layered plate into a tubular hydrogen permeation membrane having an inside wall, so that said layer adhered to said first surface is disposed on the inside wall of the tubular hydrogen permeation membrane.

2. The method of claim 1, wherein the adhering in step (a) is performed by roll bonding cladding, explosively applied cladding or diffusion welding.

3. The method of claim 1, wherein the reshaping in step (b) is performed by deep drawing, pressing or extrusion.

4. The method of claim 1, which further comprises, after the reshaping in step (b), performing at least one further reshaping by a drawing process.

5. The method of claim 1, wherein for the reshaping in step (b), a layered piece in the form of a round blank is cut out of the layered plate from step (a).

6. The method of claim 1, wherein the tubular hydrogen permeation membrane has a maximum inside tube diameter of 25 mm.

7. The method of claim 1, further comprising said at least one layer being adhered to said second surface.

8. The method of claim 1, wherein said at least one layer comprises PdY10.

9. A tubular hydrogen permeation membrane produced by the method of claim 1.

10. The method of claim 1, wherein said at least one layer comprises PdAg23.

11. The method of claim 10, wherein said plate comprises niobium.

12. The method of claim 11, wherein the tubular hydrogen permeation membrane has a wall thickness of 0.1 to 10 mm.

13. The method of claim 12, wherein the tubular hydrogen permeation membrane has a maximum inside tube diameter of 25 mm.

14. The method of claim 13, wherein the tubular hydrogen permeation membrane has a maximum inside tube diameter of 10 mm.

15. The method of claim 14, wherein the adhering in step (a) is performed by roll bonding cladding, explosively applied cladding or diffusion welding; and the reshaping in step (b) is performed by deep drawing, pressing or extrusion.

16. The method of claim 15, which further comprises after the reshaping in step (b), performing at least one further shaping by a drawing process.

17. A tubular hydrogen permeation membrane produced by the method of claim 14.

18. The method of claim 1, wherein the tubular hydrogen permeation membrane has a maximum inside tube diameter of 10 mm.

19. A tubular hydrogen permeation membrane produced by the method of claim 18.

20. In a method for isolating and purifying hydrogen in gas mixtures that contain hydrogen comprising contacting a gas mixture containing hydrogen with a hydrogen permeation membrane and thereafter recovering hydrogen, the improvement comprising the permeation membrane being the tubular hydrogen permeation membrane of claim 19.

* * * * *